United States Patent [19]
Hamblin

[11] 3,873,283
[45] Mar. 25, 1975

[54] VAPOR-LIQUID SEPARATOR
[75] Inventor: Robert J. J. Hamblin, Deerfield, Ill.
[73] Assignee: Universal Oil Products Company, Des Plaines, Ill.
[22] Filed: July 2, 1973
[21] Appl. No.: 375,968

[52] U.S. Cl. .............. 55/185, 55/204, 55/337, 55/424, 55/178, 55/DIG. 22
[51] Int. Cl. ............................................ B01d 19/00
[58] Field of Search ............ 55/159, 171, 172, 173, 55/176, 177, 178, 183, 184, 185, 186, 187, 188, 192, 193, 199, 201, 203, 204, 206, 207, 320, 337, 391, 485, 489, DIG. 22, 459, 424, DIG. 23

[56] References Cited
UNITED STATES PATENTS

| | | | |
|---|---|---|---|
| 1,581,371 | 4/1926 | Weisgerber | 55/203 X |
| 2,777,533 | 1/1957 | Sergrest | 55/204 |
| 2,788,080 | 4/1957 | Guarin | 55/183 |
| 2,863,521 | 12/1958 | Davis, Jr. | 55/192 |
| 3,213,595 | 10/1965 | Walker et al. | 55/204 |
| 3,231,251 | 1/1966 | Scheibel | 55/178 X |

Primary Examiner—Frank W. Lutter
Assistant Examiner—David L. Lacey
Attorney, Agent, or Firm—James R. Hoatson, Jr.; Robert W. Erickson; William H. Page, II

[57] ABSTRACT

A high degree of separation of entrained liquids from a resulting vapor stream and of entrained gas from a resulting liquid stream is achieved in a spherical vapor-liquid separator containing ring-shaped liquid holding trays which promote horizontal liquid flow. A mixed-phase feed stream is discharged tangential to the separator's outer wall. Liquid then flows in a circular path to a downcomer on the opposite side of the separator leading to other ring-shaped trays below and finally accumulates in a lower section of the separator from which it is discharged. The resulting slow liquid flow allows entrained gas to escape and pass horizontally thhrough ring-shaped coalescers which form part of a vertical central vapor conduit rising through the center of each ring-shaped tray and which break down liquid containing foam. Vapors from the different trays and the bottom section of the separator pass upward through the vapor conduit to an outlet on an upper section of the separator.

6 Claims, 2 Drawing Figures 3,873,283

VAPOR-LIQUID SEPARATOR

BACKGROUND OF THE INVENTION

1. Field of the Invention

My invention relates to an apparatus for the separation of gas and liquid contained in a flowing mixed-phase stream such as a partially condensed effluent of a hydrocarbon conversion process reaction zone and in such use would be referred to as a high pressure separator. My invention also relates to removal of entrained liquids from a vapor stream and to the degasifying of liquids, including the use of an apparatus which utilizes perforated materials in the vapor path for defoaming and mist elimination.

2. Description of the Prior Art

The prior art includes a wide variety of vapor-liquid separation apparatus as exemplified by U.S. Pat. Nos. 3,213,595 (Cl. 55–204), 3,306,007 (Cl. 55–169) and 2,788,080 (Cl. 55–183). Of these, U.S. Pat. No. 3,213,595 is in some aspects similar as it utilizes several circle-shaped horizontal partitions for increasing the area of the downflowing liquid. However, it does not utilize a porous central vapor conduit or teach the use of trays to increase residence time and bubble separation by passing foam-free liquid to other trays.

The prior art includes the use of multi-chambered vessels, baffles and screens to cause separation of liquid particles from the vapor phase. In some cases, it is desired to hold all internal structures to a minimum and accordingly the mixed-phase stream may be simply horizontally discharged into an empty vessel. Further examples of distinguishable prior art include U.S. Pat. Nos. 1,994,110 and 2,756,837.

SUMMARY OF THE INVENTION

My invention is an apparatus for the separation of vapors from liquids by subjecting the liquid to a series of relatively nonturbulent semi-circular horizontal passages around ring-shaped trays designed to limit the liquid's vertical velocity components and therefore allow entrained gas bubbles to rise to the surface and be removed. All the vapors initially released and those subsequently rising out of the liquid pass through cylindrical coalescing means into a large diameter vapor conduit and then through a demisting screen at a relatively low velocity. This produces a high degree of liquid removal from the vapor stream.

In one particular embodiment, my apparatus comprises: (a) a spherical outer vessel; (b) a mixed-phase hydrocarbon stream inlet means, said inlet means being located in the middle section of said outer vessel and in communication with the central volume of the vessel; (c) a vapor phase outlet means located on an upper section of said outer vessel and in communication with a hereinafter defined cylindrical vapor conduit; (d) a liquid phase outlet means located on a lower section of said outer vessel and in communication with the central volume of the vessel; (e) at least two substantially horizontally positioned and vertically spaced apart open-centered ring-shaped liquid holding trays located within said outer vessel, said ring-shaped trays being located below said mixed phase inlet means and attached to the inner structure of the outer vessel and to the central cylindrical vapor conduit to form a ring-shaped liquid holding area, the ring-shaped trays having a perforation to allow passage of liquid downward from the liquid holding area of the tray, said perforations being on opposite sides of the cylindrical vapor conduit from the perforation in the ring-shaped tray next above, with the perforation in the uppermost ring-shaped tray being located on the far side of the tray from said mixed-phase inlet means; (f) a central cylindrical vapor conduit formed by vertical walls connecting the open centers of said ring-shaped trays and extending upward to connect with the upper inner surface of the outer vessel, said cylindrical vapor conduit being in open communication with the lower internal volume of the outer vessel; and, (g) a plurality of cylindrical coalescing means comprising part of said central cylindrical vapor conduit, with a coalescing means located in the portion of the central cylindrical vapor conduit between each ring-shaped tray and a coalescing means located in the portion of the central cylindrical vapor conduit above the uppermost ring-shaped tray, the bottom edge of said coalescing means being located above the surface level of said ring-shaped trays and connected to the said ring-shaped trays below by an imperforate section of the central cylindrical vapor conduit to thereby allow the maintenance of a liquid level upon the ring-shaped tray without the passage of the liquid into the central vapor conduit and the passage of vapor into the central cylindrical vapor conduit through the coalescing means.

Figure 1:
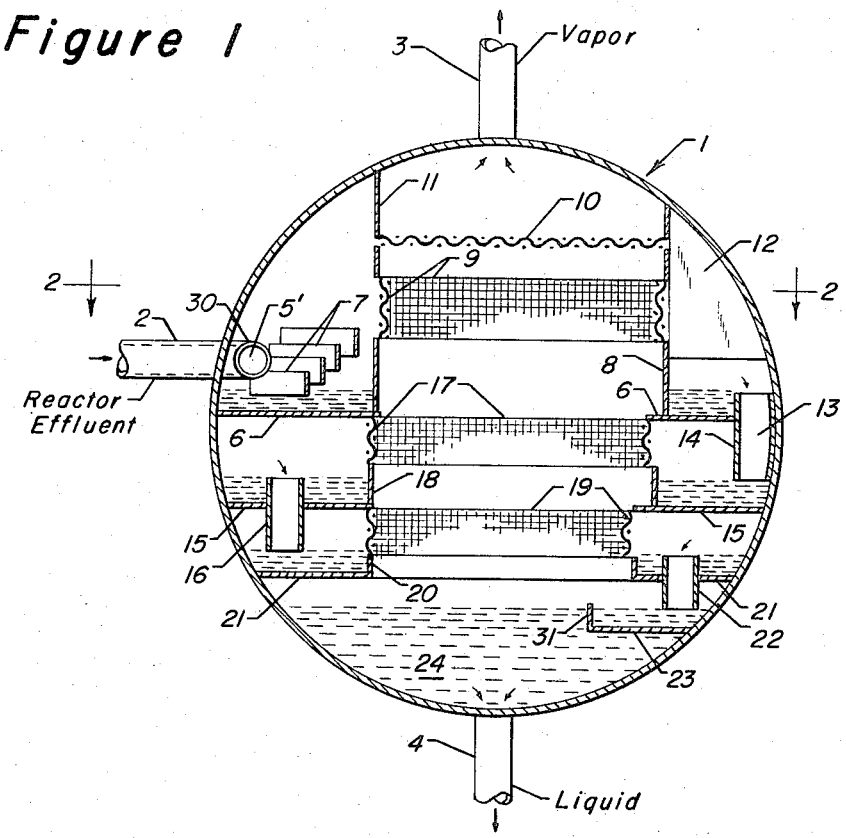
FIG. 1 is a vertical cross section looking across the separator.
Figure 2:
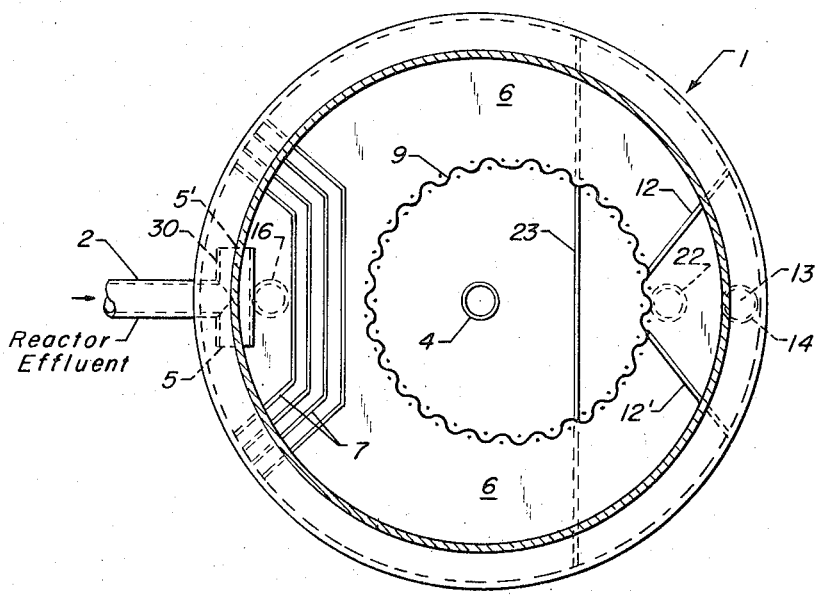
FIG. 2 is a horizontal cross section showing the view as looking downward.

The embodiment of my invention depicted in FIGS. 1 and 2 utilizes a spherical outer vessel 1, but is also applicable to cylindrical vessels. A mixed-phase stream such as a partially condensed hydrocarbon conversion process reactor effluent from line 2 enters my apparatus through a mixed-phase inlet means 30 having openings 5 and 5' orientated so to discharge the reactor effluent in a horizontal direction approximately tangential to the inner wall of the outer vessel. The mixed-phase inlet means 30 is represented in FIG. 2 as a simple tee attached to line 2, preferably placed close to the inner wall of the vessel.

Liquid issuing out of opening 5 falls upon the horizontal surface of an uppermost ring-shaped open-centered liquid holding tray 6 similar to what is commonly referred to as a "donut" tray. This liquid holding tray is substantially horizontally positioned and is vertically spaced above two other open-centered ring-shaped trays 15 and 21 of similar construction. The inner edges of the trays are attached to imperforate cylindrical walls 8, 18 or 20 respectively which prevents the flow of liquid into a central vapor conduit hereinafter described. The outer edge of the liquid holding trays is attached to the inner structure of the outer vessel 1 which is normally the inner surface of the vessel but may be a partition or channel.

Liquid flows around the central vapor conduit in the center of the tray to a perforation or opening 13 commonly referred to as a downcomer formed by conduit 14 which extends both above and below the level of the liquid holding tray 6. This upward extention or weir creates a liquid holding area on the tray in which the incoming liquid from line 2 is trapped until its level raises above the top of conduit 14 and some of the liquid spills over into perforation 13 to descend to liquid holding tray 15 located below. It is preferred that the perforation be located on the opposite side of the vessel from the mixed-phase inlet to maximize the length of time needed for liquid to travel to the perforation.

The mixed-phase material discharged through opening 5 often has a tendency to gush and foam and accordingly a series of mixed-phase inlet distributors 7 are placed on the upper tray 6 to lessen the churning of the liquid on the tray by surges of liquid emitted from line 2. Foam barriers 12 and 12' extend from the inner wall of the vessel to the central vapor cylinder to prevent the passage of froth to the vicinity of conduit 14 and down to the next tray.

Vapor discharged from line 2 or released from the liquid on tray 6 passes through a cylindrical coalescing means 9, such as several layers of woven wire, which results in a break down of substantially all of the entering foam into gas and liquid which then separate by the action of gravity. Located above coalescing means 9 is a cylindrical wall 11 which forms the uppermost section of a cylindrical vapor conduit formed by the coalescing means 9, 17 and 19 and imperforate walls 8, 18 and 20 located below. The central cylindrical vapor conduit serves to collect and guide vapors upward to a vapor phase outlet line 3. Vapors enter the central vapor cylinder through the three coalescing means shown and also through the open bottom of the central cylinder which communicates with the lower internal volume of the outer vessel below tray 21 containing a quantity of collected liquid 24. Located in an upper section of the central vapor cylinder at a point above the uppermost coalescing means is a demisting screen 10 chosen for its qualities in removing fine droplets of liquids entrained in the upward flowing vapor stream.

Liquid which passes through conduit 14 falls onto the next lower ring-shaped liquid holding tray 15 having an open-center which is sealed off by imperforate cylindrical wall 18. The liquid therefore flows in a semicircle around either side of the central vapor conduit defined at this level by the cylindrical wall 18 to a second perforation shown as conduit 16. During the time required for this travel, gas bubbles rise to the top of the liquid and either the gas is released or a foam is formed. The gas or foam can then pass into cylindrical coalescing means 17 and vapors thereby pass into the central vapor conduit for passage upward to vapor outlet line 3.

The liquid which passes through conduit 16 onto ring-shaped tray 21 performs a third semicircular passage around the central vapor conduit which at this point is defined by cylindrical wall 20 and cylindrical coalescing means 19 above wall 20. Both coalescing means 17 and 19 are shown as attached to the lower surface of the next above tray, but may end some distance below this point and be connected to the tray by a solid wall similar to that below them. Liquid held on tray 21 spills over into conduit 22 leading to a liquid holding volume in the lower internal volume of the outer vessel. As shown, I prefer that a horizontal plate 23 with a weir edge or lip 31 be placed under conduit 22 to reduce the tendency of the liquid flow through the conduit from disturbing the bulk of liquid 24 contained in the vessel. This bulk holding of liquid also permits some additional release of vapors in the central vapor conduit before the liquid is discharged through liquid outlet means 4.

FIG. 2 presents a view of the apparatus as seen if it is sectioned horizontally at section line 2 just above mixed-phase inlet means 30. The material carried in line 2 enters the vessel 1 through openings 5 and 5' and liquid falls to the surface of tray 6. Inlet distributors 7 even out the flow of the liquid below the bottom edge of cylindrical coalescing means 9 to conduit 14 at perforation 13 on the opposite side of the vessel from the inlet. Excessive foam is prevented from approaching the perforation 13 by foam barriers 12 and 12'. Also shown is the horizontal plate 23 in the lower portion of the vessel under conduit 22 and the opening for the liquid outlet line 4. The positions of conduits 22 and 16 on the lower decks is also indicated.

This description is intended to clarify and explain one specific embodiment of my invention and not to unduly limit the scope in which the appended claims are interpreted. For simplicity, the drawing does not indicate such normally present features as manways in the vessel wall to allow periodic inspection and maintanance or control systems which usually utilize an internal liquid level sensing device.

DETAILED DESCRIPTION

In the chemical processing industries it is often required to separate a mixed-phase stream into separate vapor and liquid streams which are substantially free of the other phase of the separated material. Often more than one such separation is utilized in a single hydrocarbon process with the liquid stream produced in a first separation step being cooled or lowered in pressure prior to a subsequent separation. Besides separating process product streams, separators may be used to remove entrained liquid from recycle gas streams about to be fed to a compressor or to treat such divergent material as crude oil just removed from a well.

It is therefore an object of my invention to provide an apparatus which separates a mixed-phase hydrocarbon stream and produces a vapor stream substantially free of any liquid particles. It is a further object of my invention to provide an apparatus which separates a mixed-phase hydrocarbon stream and produces a liquid stream substantially free of entrained vapor in the form of bubbles. It is another object of my invention to lessen the problems associated with the foaming which occurs when a partially liquefied hydrocarbon stream is subjected to turbulence or a reduction in pressure during a separation step.

My apparatus is specifically adaptable to use in a hydrocarbon conversion process and would be referred to as a high pressure separator or a low pressure separator. These separators are often found directly downstream of the reaction zone of the conversion process and are utilized for separating the reaction zone effluent into a light vaporous recycle stream and a heavier liquid fraction which is then normally fractionated.

Basic to the structure of my apparatus is an outer vessel which may be either spherical or cylindrical in shape. If it is cylindrical, it would be vertically oriented. That is to say, the axis passing lengthwise through the cylinder would be orientated in a vertical direction, normally straight up and down. This vessel and the other internal structures contained therein will normally be fabricated from a suitable metal such as carbon steel or stainless steel depending on the conditions imposed upon the vessel by the process. It is possible however that other materials such as reinforced plastics and fiberglass could also be used in locations having moderate pressures and temperatures. An example of this is the separation of gaseous material from a room temperature water stream. A circumstance in which this may be required could arise in such applications as the treatment of a waste water stream from a chemical process plant such as a pulp mill or a petroleum refinery.

A mixed-phase hydrocarbon stream inlet means will pass through the outer wall of the vessel into a middle section of the outer vessel to permit the discharge of the mixed-phase stream into the apparatus. A vapor-phase outlet means will normally be connected to an upper section of the outer vessel to allow the withdrawal of the vapor phase produced in the apparatus. Also, a liquid outlet means is located on a lower section of the outer vessel to allow the withdrawal of the liquid formed therein. The exact location of any of these openings in the wall of the vessel is subject to certain design considerations which may be unique to the material treated. By the upper section of the apparatus is meant that portion of the apparatus located above a horizontal plane passing through the vessel at a point one-third of the vertical distance down from the uppermost part of the vessel. In a like manner, the lower section of the vessel is defined to be that portion of the apparatus located below a horizontal plane passing through the vessel at a point one-third of the vertical distance from the bottom of the vessel to the top of the vessel. The section of the vessel between these two horizontal planes, which are perpendicular to vertical axis of the vessel, is considered the middle section of the vessel. This geometrical division of the outer vessel will therefore define the location of the hydrocarbon passageways which are in communication with the internal portion of the vessel.

A mixed-phase stream to be separated in the apparatus passes through the outer wall of the vessel and is directed in a substantially tangential direction, in reference to the outer wall of the vessel, by an inlet means such as the simple tee shown in the drawing. The object of this is to spread the liquid phase over the surface of the outer vessel and tray and to direct it in a circular path towards the opposite side of the vessel. A third very important function of the inlet means is to prevent the direct impingement of high velocity incoming material onto foraminous sections of the central vapor conduit to be described later.

The liquid will fall onto a substantially horizontal, open centered and ring-shaped liquid holding tray located a short distance below the inlet means. This tray is similar in construction to what is called a "donut" tray in refining terminology. The outer edge of the tray is attached to the internal surface of the outer vessel or any other form or partition protruding therefrom to form a liquid-tight seal which prevents the passage of the liquid downward from the tray. The tray is also attached to an imperforate cylindrical wall at the inner edge of the tray. Therefore the tray forms a circular trough or holding volume for the liquid, the volume of which may be designed to contain the liquid for a certain average residence time before the liquid is discharged. Located preferably on the opposite side of the apparatus from the inlet means is a perforation or downcomer which passes through the ring-shaped holding tray to allow passage of liquid to a second tray located below. The opening or perforation is surrounded by a vertical lip or weir which controls the liquid height upon the liquid holding tray. Because of this construction, it is necessary for the incoming liquids to flow in a semicircular path around the outer edge of the vessel before descending through the downcomer. Judicious design of the height and the width of the liquid holding area allows the production of laminar flow which is beneficial to the separation of entrained gases from the liquid material.

The liquid holding trays are substantially horizontally positioned and normally will be level. But there may be instances in which it is desired to place the trays at a slight angle to either promote the flow of certain material so to cause a rinsing action across the bottom of the tray or to increase the depth of the liquid on one part of the tray to benefit the removal of entrained gases from the liquid. The liquid holding trays are vertically spaced above one another in a manner similar to that used in a fractionation column. The spacing between the trays is dependent upon the desired depth of liquid in the tray and the height of the porous part of the central vapor conduit located between the trays. A perforation or downcomer of each tray below the topmost tray is located on the opposite side of the vessel from the downcomer next above it to necessitate the semicircular passage of the liquid on each tray. By placing the liquid flow path on the outer periphery of the vessel a longer flow path is achieved. This is in contrast to prior art apparatus which utilized either a central flow path or a flow path which utilizes a holding section which extends the entire radius of the vessel from its outer edge to its center. My design also allows the utilization of the relatively large surface area of a cylinder to thereby achieve a slow rate of passage of the released vapors and foam through the coalescing mesh of the central vapor conduit.

A central cylindrical vapor conduit is formed by the vertical walls connecting the open centers of each ring-shaped liquid holding tray and extends upward to connect with the upper inner surface of the outer vessel. The cylindrical vapor conduit is in open communication with the lower internal volume of the outer vessel which contains a large bulk of retained liquid. This may be alternatively expressed as saying that the central vapor conduit is an open-bottomed cylinder located in the center of the ring-shaped trays and normally not extending below the surface of the bottommost tray as is shown in the drawing. It should be noted that the central vapor conduit shown in the drawing does not have a uniform radius or a continuous vertical wall but is rather made up of individual cylindrical wall sections stacked upon one another. These individual cylindrical wall sections are the respective cylindrical coalescing means used above each tray and the respective imperforate cylindrical walls attached to the center of the liquid holding tray as liquid barriers and the cylindrical wall which attaches the top of the uppermost coalescing means to the upper surface of the outer vessel.

The coalescing means function to break down the foam generated when the inlet stream is charged to the apparatus. They work most efficiently with a specific velocity in the system and their relative size is therefore dependent on the quantity of gaseous material which is intended to be charged to the apparatus. It is also necessary to balance the relative gas velocities through the cylindrical coalescing means and a horizontal demisting means located in the central vapor conduit above the uppermost coalescing means. For this reason, the diameter of the central vapor conduit at this point is critical and will therefore be relatively large as is shown in the drawing. This however is not a serious drawback because one does not gain much of a reduction in the liquid flow rate around the liquid holding tray by making the vapor conduit smaller in diameter. Both the coalescing means and the demisting means may be made of the same material, and commonly a woven wire such as a York or Metex mesh is used. The size of the demisting means, the coalescing means and the liquid holding tray are all adjusted on the basis of the relative properties of the material to be separated. Aids to the design of the demister are contained in the June, 1961, *Hydrocarbon Processing and Petroleum Refiner*, Vol. 40, NO. 6, pages 155 and 156.

The ring-shaped liquid holding trays serve to increase the vapor-liquid interfacial area to aid in the breakdown of foam and separation of gas bubbles. Separation of the gas bubbles is encouraged by designing the trays to produce laminar flow of the liquid with no vertical velocity components. The gas bubbles therefore are allowed to rise to surface of the liquid and may discharge vertically or be "scraped" off the liquid by the foam barriers 12 and 12'. Although not shown, additional foam barriers may be placed before the downcomers of the lower liquid holding trays to repeat this operation. The liquid 24 contained in the lower section of the apparatus should also be maintained as stagnant as possible to aid in the escape of entrapped gases. Vapors released in the lower section by the breakdown of foam will enter the central vapor conduit and pass upward to the vapor outlet means. Liquid formed on the demister means in the central vapor conduit or in the coalescing means will drip down the vapor conduit to exit by the liquid outlet means.

Other internal structures may be located within the vessel to facilitate directing the liquid flow and the breakdown of the foam. Examples of these are the inlet flow distributors 7 shown in the drawing. These fucntion to prevent surges of the incoming liquid from churning and mixing material held upon the liquid holding tray and thereby lessening the tendency of the entrained gases to rise and separate. They may also be designed to aid in the prevention of direct impact of high velocity liquid or gas streams upon the cylindrical coalescing means located above the uppermost tray. Another typical structure is exemplified by foam barriers 12 and 12' which extend from the inner wall of the vessel to the central vapor conduit to prevent the passage of foam to the downcomer. In this way, the foam is restained on the uppermost tray and either breaks down on the tray or passes into the coalescing means and does not descend to a lower tray to inhibit separation of entrained gases from the liquid phase on the lower tray.

Liquid which descends from the uppermost tray is subjected to relatively the same separation process on the next tray and any other tray located below it. In the separation of the effluent from a hydrotreating plant processing a relatively heavy oil stream, it is desired that about three trays be used but a differing number may be preferred in other applications. The degree of separation achieved in the apparatus is directly dependent upon the bubble diameter of the vapor within the liquid phase because the smaller bubbles rise at a slower rate. With the apparatus of my invention a near 100 percent separation of those bubbles having a diameter above 0.20 millimeters should be achieved.

The liquid which spills over into the downcomer of the lowermost tray is collected in a liquid holding volume in the lower internal volume of the outer vessel. It is preferred that a horizontal plate with a weir edge or lip be placed under the downcomer to reduce the tendency of this descending liquid from disturbing the bulk of the liquid contained in this volume. The level of this liquid will probably be controlled by some system as is well known in the art and which need not be further discussed. Although a separate compartment or chamber may be utilized as this liquid holding volume, it will normally comprise simply the bottom portion of the outer vessel as shown in the drawing.

In one specific design of my apparatus, the outer vessel comprises a 10.5' diameter sphere to which is charged 1,281,670 lbs. of mixed material per hour. Of this, 975,600 lbs./hour is removed as liquid having an API of 25.1° with the vapor having an average molecular weight of 14.05. In this application, the design includes the use of three liquid holding trays each of which is designed to hold 4 inches of liquid, and the wire mesh used for the cylindrical coalescing means is in each instance 9 inches high.

In a second example, a mixture of about 675,000 lbs./hour of liquid having an API of 22.7° and about 348,000 lbs./hour of a vapor having a molecular weight of about 15 is charged to a 10.5' inside diameter sphere. The apparatus in this case utilizes three rings each 1.5 feet wide and designed to maintain 6 inches of liquid. The woven wire mesh used in the central vapor conduit is 1 foot high.

I claim:

1. A vapor-liquid separation apparatus useful in separating a mixed-phase hydrocarbon conversion process stream which comprises:
   a. a spherical vessel having an upper section, a middle section, a lower section and a spherical internal volume delineated by the inner surface of said spherical vessel;
   b. a mixed-phase hydrocarbon stream inlet means, the inlet means being located in the middle section of the vessel and in communication with the internal volume of the vessel;
   c. at least two substantially horizontal and vertically spaced apart open centered ring-shaped liquid holding trays, the trays being located below said mixed-phase inlet means and having a circular outer edge which adjoins the inner surface of the vessel over the entire circumference of the tray, the trays also having a raised lip surrounding the centrally located circular opening in the trays and delineating a ring-shaped liquid holding area upon the trays;
   d. liquid downcomer means in each of said trays with the downcomer means of said uppermost tray comprising a weir on an upper surface of said uppermost tray and a vertical conduit extending downward from a perforation in the surface of the uppermost tray located within the weir to a point above a lower second tray, the downcomer means of said uppermost tray being located on the opposite side of the circular opening in the uppermost tray from the mixed-phase inlet means;
   e. a centrally located cylindrical vapor conduit comprising an imperforate cylindrical wall attached to the inner surface of the vessel in the upper section of the vessel and extending downward to a point above the raised lip of the uppermost of the trays;

f. a plurality of cylindrical coalescing means, with a first coalescing means connecting the raised lip on the uppermost of the trays with the imperforate wall of the vapor conduit, and with a second coalescing means connecting a lower surface of the uppermost of the trays to the raised lip of the lower second tray;

g. a vapor phase outlet means located in the upper section of the vessel and in communication with the cylindrical vapor conduit; and, h. a liquid phase outlet means located in the lower section of the vessel below all of the trays and in communication with the internal volume of the vessel.

2. A separating apparatus according to claim 1 including demisting means located in cylindrical vapor conduit at a point above the top of the uppermost coalescing means.

3. A separating apparatus according to claim 2 wherein said dimisting means and said coalescing means are made of a woven wire.

4. A vapor-liquid separation apparatus useful in separating a mixed-phase hydrocarbon conversion process stream which comprises:

a. a vertically orientated cylindrical vessel having an upper section, a middle section, a lower section and a cylindrical internal volume delineated in part by the inner surface of said cylindrical vessel b. a mixed-phase hydrocarbon stream inlet means, the inlet means being located in the middle section of the vessel and in communication with the internal volume of the vessel;

c. at least two substantially horizontal and vertically spaced apart open centered ring-shaped liquid holding trays, the trays being located below said mixed-phase inlet means and having a circular outer edge which adjoins the cylindrical inner surface of the vessel over the entire circumference of the tray, the trays also having a raised lip surrounding a centrally located circular opening in the trays and delineating the ring-shaped liquid holding area upon the trays;

d. liquid downcomer means in each of said trays with the downcomer means of said uppermost tray comprising a weir on an upper surface of said uppermost tray and a vertical conduit extending downward from a perforation in the surface of the uppermost tray located within the weir to a point above a lower second tray, the downcomer means of the uppermost tray being located on the opposite side of the circular opening in the uppermost tray from the mixed-phase inlet means;

e. a centrally located cylindrical vapor conduit comprising an imperforate cylindrical wall attached to a substantially horizontal inner surface of the vessel in the upper section of the vessel and extending downward to a point above the raised lip of the uppermost of the trays;

f. a plurality of cylindrical coalescing means, with a first coalescing means connecting the raised lip on the uppermost of the trays with the imperforate wall of the vapor conduit, and with a second coalescing means connecting a lower surface of the uppermost of the trays to the raised lip of the lower second tray;

g. a vapor phase outlet means located in the upper section of the vessel and in communication with the cylindrical vapor conduit; and, h. a liquid phase outlet means located in the lower section of the vessel below all of the trays and in communication with the internal volume of the vessel.

5. A separating apparatus according to claim 4 including demisting means located in said cylindrical vapor conduit at a point above the top of the uppermost coalescing means.

6. A separating apparatus according to claim 5 wherein said demisting means and said coalescing means are made of woven wire.

* * * * *